United States Patent Office 3,232,923
Patented Feb. 1, 1966

3,232,923
POLYPEPTIDES
Roger Boissonnas, Bottmingen, Basel-Land, and Stephan Guttmann, Basel, Switzerland, assignors to Sandoz A.G., Basel, Switzerland
No Drawing. Filed June 13, 1960, Ser. No. 35,460
Claims priority, application Switzerland, July 24, 1959, 76,169/59
4 Claims. (Cl. 260—112.5)

The present invention is concerned with new and useful polypeptides.

Primarily, the invention is concerned with the novel and therapeutically useful polypeptide of the formula

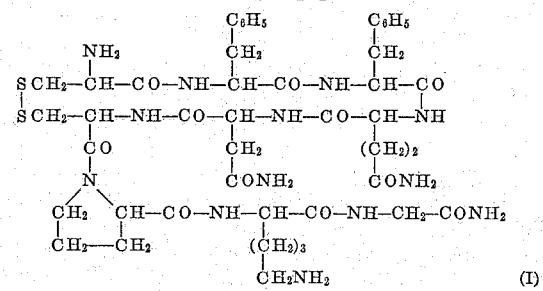

which is characterized more especially by its pressor activity.

The said polypeptide I can advantageously be prepared by converting a nonapeptide

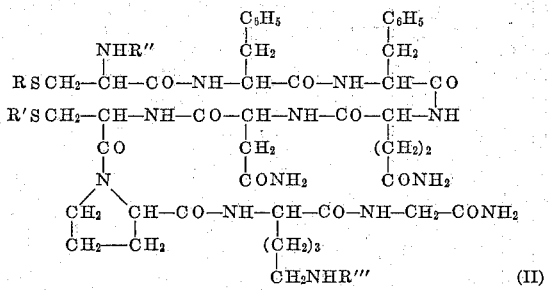

wherein R and R' represent readily removable groups— e.g. phenyl, benzyl, p-bromo-benzyl, tolyl or p-xylyl, etc.—which have been introduced to protect the originally present sulfhydryl groups, and R'' and R''' represent readily removable groups—e.g. benzenesulfonyl, toluenesulfonyl, carbophenoxy, carbobenzoxy, carbo-p-bromo-benzoxy—which have been introduced to protect the originally present amino groups, into the nonapeptide

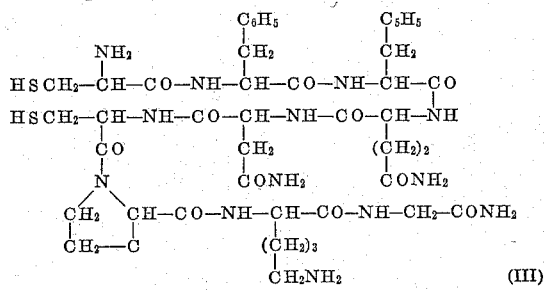

by reduction with an alkali metal, advantageously sodium or potassium, in liquid ammonia, and then converting the linear nonapeptide III into the desired end product I by oxidation in aqueous solution.

The new polypeptide I of the present invention has a vasopressor action of the same magnitude as that of natural Vasopressin

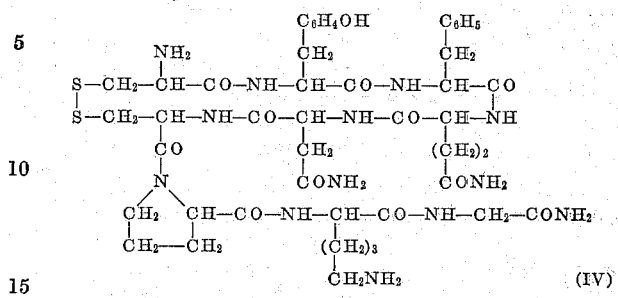

Surprisingly, however, the antidiuretic action of compound I is only ⅓ of that of compound IV. Furthermore, the uterotonic action of compound I is only about 2% of the already-weak uterotonic action of Vasopressin. Compound I is thus distinguished from Vasopressin by a specific vasopressor action.

The aforesaid surprising properties of compound I are significantly advantageous in counteracting surgical shock, for producing local ischaemia (reduced bleeding) in operations, more especially in gynecology (e.g. in vaginal operations), in otorhinolaryngology (e.g. in tonsillectomies and ear operations), in surgery (e.g. in strumectomies and bloody urological operations), as well as for supplements to local anesthetics used more especially in dentistry. Compound I offers particular advantages in comparison with adrenalin; while the latter generally brings about considerable increases in blood pressure and in pulse rate, such increases are not engendered by compound I which nevertheless is at least equal to adrenalin in local ischaemia-producing action. The compound I is essentially free of undesired side effects and may be administered, for instance directly, to accessible bleeding surfaces (e.g. on cotton or gauze pledgets).

In another aspect of the invention, it is concerned with new compounds (cf. compounds II and III, supra) which are useful intermediates for the preparation of compound I. The preparation of these intermediates and the role they play in the production of compound I may be summarized as follows, it being understood that any of the hereinbefore-mentioned R, R', R'' and R''' variables may be present in lieu of those here selected for illustrative purposes only:

Starting with for example N-carbobenzoxy-L-glutaminyl-L-asparaginyl-S-benzyl-L-cysteinyl-azide

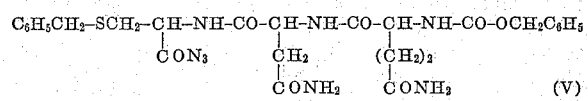

[cf. Boissonnas and coll., Helv. Chim. Acta, vol. 38, 1491 (1955)], this is condensed with L-prolyl-ε-N-p-toluenesulfonyl-L-lysyl-glycinamide

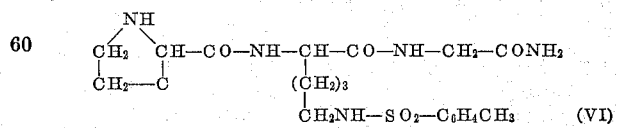

The latter can be prepared by splitting off the carbobenzoxy group from N-carbobenzoxy-L-prolyl-ε-N-p-toluenesulfonyl-L-lysyl-glycinamide [cf. Du Vigneaud and coll., J.A.C.S., vol. 78, 5884 (1956)]. The hexapeptide

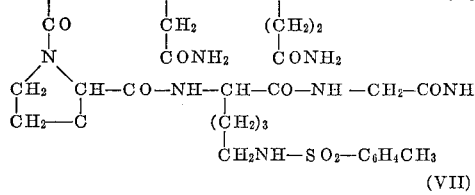
(VII)

resulting from the condensation of azide V with glycinamide VI, is condensed—after splitting off the carbobenzoxy group — with N - carbobenzoxy - S - benzyl - L-cysteinyl-L-phenylalanyl-L-phenylalanyl-azide

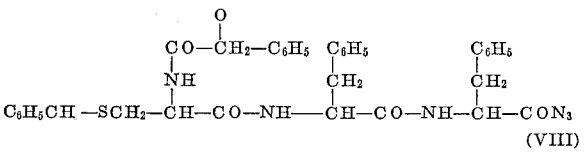
(VIII)

Compound VIII can be prepared by condensation of N - carbobenzoxy - S-benzyl-L-cysteinyl-L-phenylalanine [cf. Jaquenod and Boissonnas, Helv. Chim. Acta, vol. 42, 788 (1959)] with L-phenylalanine-methylester, followed by conversion into the azide in conventional manner. The nonapeptide II, resulting from the condensation of hexapeptide VII with azide VIII, is treated with an alkali metal—sodium or potassium—in liquid ammonia, so that the linear nonapeptide III results. Nonapeptide III is subjected to oxidation, preferably with air, oxygen or hydrogen peroxide, in aqueous solution to yield the biologically active, cyclic polypeptide I.

The following examples set forth presently-preferred illustrative embodiments of the invention. In these examples, parts by weight bear the same relationship to parts by volume as do grams to milliliters. Percentages are by weight. Temperatures are expressed in degrees centigrade.

EXAMPLE 1

(a) *N-carbobenzoxy-L-glutaminyl-L-asparaginyl-S-benzyl-L - cysteinyl - L prolyl - ϵ-N-p-toluenesulfonyl-L-lysyl-glycinamide*

200 parts by weight of N-carbobenzoxy-L-prolyl-ϵ-N-p-toluenesulfonyl-L-lysyl-glycinamide are dissolved in 1000 parts by volume of anhydrous acetic acid which has been saturated with HBr, the mixture allowed to stand for one hour at 20° and then evaporated under reduced pressure at below 40°. The residue from this evaporation is carefully washed with diethyl ether and then added to a solution of 185 parts by weight of N-carbobenzoxy-L-glutaminyl - L-asparaginyl-S-benzyl-L-cysteinyl-azide and 48 parts by volume of triethylamine in 1500 parts by volume of dimethylformamide. The mixture is allowed to stand overnight at 20° and the mixture is then poured into twice its volume of acetone. The precipitate which settles out is filtered off, washed with water, and recrystallized from dimethylformamide - acetone. There are thus obtained 190 parts by weight of N-carbobenzoxy-L-glutaminyl - L - asparaginyl-S-benzyl-L-cysteinyl-L-prolyl-ϵ - N - p - toluenesulfonyl - L-lysyl-glycinamide; M.P. 165° (decomposition); $[\alpha]_D^{21} = -38°$ (c.=2; dimethylformamide).

(b) *N-carbobenzoxy-S-benzyl-L-cysteinyl-L-phenylalanyl-L-phenylalanyl-azide*

57 parts by weight of dicyclohexylcarbodiimide are added to a mixture of 111 parts by weight of N-carbobenzoxy-S-benzyl-L-cysteinyl-L-phenylalanine, 54 parts by weight of L-phenylalanine-methylester hydrochloride and 35 parts by volume of triethylamine in 1250 parts by volume of acetonitrile and 1000 parts by volume of pyridine. The reaction mixture is allowed to stand overnight at 20°. The mixture is then filtered, after which the filtrate is evaporated under reduced pressure. The residue of this evaporation is washed with petroleum ether and then recrystallized from hot methanol. There are obtained 110 parts of N-carbobenzoxy-S-benzyl-L-cysteinyl-L-phenylalanyl-L-phenylalanine-methylester (M.P. 163°). The latter is heated for two hours at 60° in a solution of 3500 parts by volume of methanol and 88 parts by volume of hydrazine hydrate. The resultant precipitate is filtered off and carefully washed with water and methanol. There are obtained 91 parts by weight of N-carbobenzoxy-S-benzyl - L - cysteinyl - L - phenylalanyl - L - phenylalanyl-hydrazide (M.P. 210°). The latter is dissolved in a mixture of 1100 parts by volume of dimethylformamide, 830 parts by volume of isopropanol and 69 parts by volume of 12-normal aqueous hydrochloric acid. To the cooled solution, there are first added 30 parts by volume of 5-normal sodium nitrite solution followed, after 10 minutes, by 4300 parts by volume of 0.2-normal aqueous sodium bicarbonate. The resultant precipitate is filtered off, washed with water and rapidly dried under reduced pressure. There are obtained 90 parts of N-carbobenzoxy-S-benzyl-L-cysteinyl-L-phenylalanyl-L-phenylalanyl-azide, which is forthwith further worked up.

(c) *N-carbobenzoxy-S-benzyl-L-cysteinyl-L-phenylalanyl-L-phenylalanyl - L - glutaminyl-L-asparaginyl-S-benzyl-L-cysteinyl-L-prolyl - ϵ - N - p - toluenesulfonyl-L-lysyl-glycinamide*

50 parts by weight of N-carbobenzoxy-L-glutaminyl-L-asparaginyl - S - benzyl-L-cysteinyl-L-prolyl-ϵ-N-p-toluenesulfonyl-L-lysyl-glycinamide are dissolved in 400 parts by volume of anhydrous acetic acid which is saturated with HBr, and the mixture allowed to stand for one hour at 20°. After evaporating off the solvent under reduced pressure at a temperature of 35° (or another temperature below 40°), the residue is carefully washed with diethyl ester, whereupon a solution of 32 parts by weight of N-carbobenzoxy-S-benzyl-L-cysteinyl-L-phenylalanyl-L-phenylalanyl-azide and 70 parts by volume of triethylamine in 500 parts by volume of dimethylformamide is added. The mixture is allowed to stand for two days at 20°, after which twice its volume of ethylacetate is added and the resultant precipitate then washed with warm methanol. There are obtained 45 parts by weight of N-carbobenzoxy - S - benzyl-L-cysteinyl-L-phenylalanyl-L-phenylalanyl - L - glutaminyl - L - asparaginyl-S-benzyl-L-cysteinyl-L-prolyl-ϵ-N-p-toluenesulfonyl - L - lysyl-glycinamide; M.P. 222°; $[\alpha]_D^{21} = -50°$ (c.=1; dimethylformamide). This compound corresponds to the formula

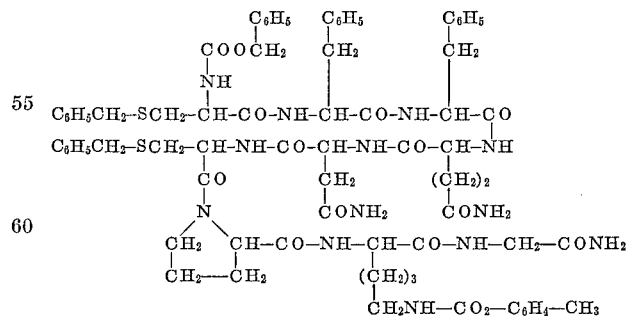

Calculated for $C_{75}H_{91}O_{15}N_{13}S_3$: C, 59.6%; H, 6.1%; O, 15.9%; N, 12.1%; S, 6.4%. Found: C, 59.4%; H, 6.4%; O, 16.0%; N, 11.7%; S, 6.5%.

(d) *L-cysteinyl-L-phenylalanyl-L-phenylalanyl-L-glutaminyl-L-asparaginyl - L - cysteinyl - L - prolyl-L-lysyl-glycinamide*

Metallic potassium is stirred into a solution of 10 parts by weight of N-carbobenzoxy-S-benzyl-L-cysteinyl-L-phenylalanyl-L-phenylalanyl - L - glutaminyl-L-aparaginyl-S-benzyl - L - cysteinyl-L-prolyl-ϵ-N-p-toluenesulfonyl- L-lysyl-glycinamide in 2500 parts of dry liquid ammonia at boiling temperature of the solution, until a stable blue coloration appears. After the addition of 1.8 parts by weight of ammonium chloride, the solution is evaporated to dryness. The residue of this evaporation contains the desired L - cysteinyl - L - phenylalanyl-L-phenylalanyl-L-glutaminyl - L - asparaginyl-L-cysteinyl-L-prolyl-L-lysyl-glycinamide.

(e) *Polypeptide compound I*

The aforesaid residue, containing the L-cysteinyl-L-phenylalanyl - L - phenylalanyl - L - glutaminyl-L-asparaginyl-L-cysteinyl-L-prolyl-L-lysyl-glycinamide, is dissolved in 20,000 parts by volume of 0.01-normal acetic acid and is then oxidized by passing air into the solution at a pH of 6.5–8.0 for one hour. The solution, which now contains compound I, is adjusted to a pH of 4.0–5.0, whereupon 100 parts by weight of sodium chloride are added and the mixture evaporated to dryness, yielding a dry powder of good stability. It can be stored, and yields a clear solution e.g. in water or other appropriate solvent. The solution may be used directly or, if desired, after dilution with water or a sodium chloride solution.

EXAMPLE 2

Example 1 is repeated, except that the metallic potassium used in paragraph (d) is replaced by metallic sodium. The final result is the same.

EXAMPLE 3

The procedure according to paragraphs (a), (b), (c) and (d) of Example 1 is repeated. The procedure according to paragraph (e) is modified in that instead of air, use is made of oxygen gas as the oxidizing agent.

EXAMPLE 4

The procedure according to paragraphs (a), (b), (c) and (d) of Example 1 is repeated. The further procedure is as described in paragraph (e) of Example 1, except that the oxidation is carried out by the addition of 15 parts by volume of a 1-molar solution of hydrogen peroxide in water at a pH of 4.0–6.0 (instead of oxidation by introduction of air).

Having thus disclosed the invention, what is claimed is:
1. The cyclic polypeptide of the formula

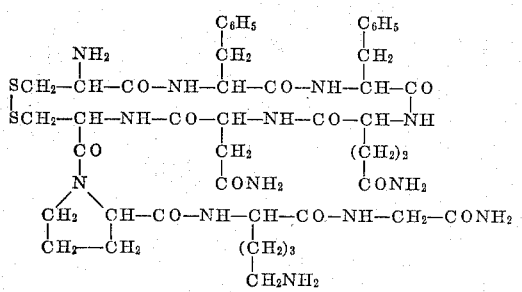

2. The linear polypeptide of the formula

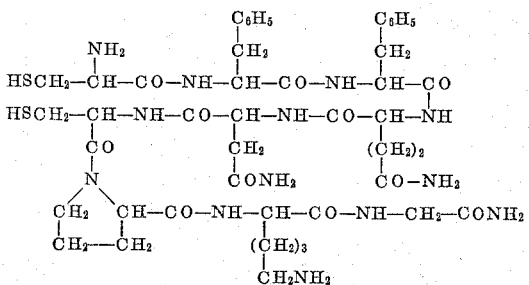

3. The compound of the formula

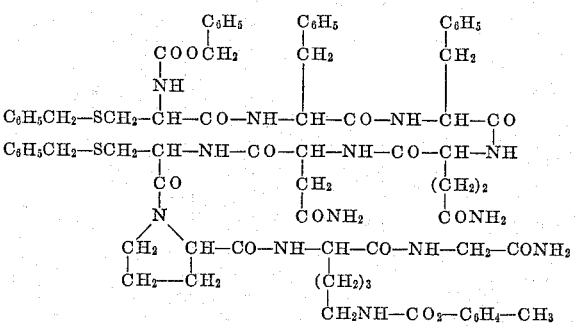

4. A compound of the formula

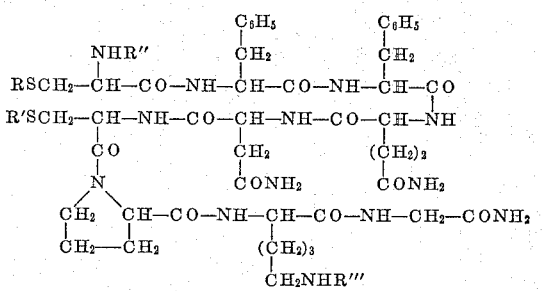

wherein each of R and R′ independently is a member selected from the group consisting of phenyl, benzyl, p-bromo-benzyl, tolyl and p-xylyl, and each of R″ and R‴ is a member selected from the group consisting of benzenesulfonyl, toluenesulfonyl, carbophenoxy, carbobenzoxy and carbo-p-bromo-benzoxy, and wherein R and R′ jointly represent a bond between the adjacent S atoms.

References Cited by the Examiner

Berde et al.: C.A. 52, 5659H (1958).
Jaquenoud et al.: "Helvetica Chemica Acta" 42 (788–793), 6 pages, 1959.
Katsoyannis et al.: J. Biol. Chem., vol. 233, pages 1352–54 (1958).

LEWIS GOTTS, *Primary Examiner.*

CHARLES B. PARKER, LEON ZITVER, *Examiners.*